(12) United States Patent
Ward et al.

(10) Patent No.: US 7,460,541 B2
(45) Date of Patent: Dec. 2, 2008

(54) METHOD AND APPARATUS TO MONITOR AND ANALYZE NETWORK INFORMATION OF AN INVERSE MULTIPLEXED ASYNCHRONOUS TRANSFER MODE NETWORK

(75) Inventors: Robert Geoffrey Ward, Colorado Springs, CO (US); Roger William Ruhmow, Monument, CO (US); Allan Wallace Dodge, Colorado Springs, CO (US)

(73) Assignee: Agilent Technologies, Inc., Santa Clara, CA (US)

( * ) Notice: Subject to any disclaimer, the term of this patent is extended or adjusted under 35 U.S.C. 154(b) by 630 days.

(21) Appl. No.: 10/948,681

(22) Filed: Sep. 24, 2004

(65) Prior Publication Data

US 2006/0072579 A1    Apr. 6, 2006

(51) Int. Cl.
 *H04L 12/56* (2006.01)
(52) U.S. Cl. .................................................. 370/395.1
(58) Field of Classification Search ........................ None
 See application file for complete search history.

(56) References Cited

U.S. PATENT DOCUMENTS

| | | | |
|---|---|---|---|
| 5,761,191 A * | 6/1998 | VanDervort et al. | 370/232 |
| 5,764,626 A * | 6/1998 | VanDervort | 370/232 |
| 6,181,680 B1 * | 1/2001 | Nagata et al. | 370/248 |
| 6,205,142 B1 * | 3/2001 | Vallee | 370/394 |
| 6,621,794 B1 * | 9/2003 | Heikkinen et al. | 370/235 |
| 6,678,275 B1 * | 1/2004 | DeGrandpre et al. | 370/395.7 |
| 6,717,960 B1 * | 4/2004 | Anesko et al. | 370/536 |
| 6,952,434 B1 * | 10/2005 | Jagannatharao et al. | 370/536 |
| 7,065,104 B1 * | 6/2006 | Seren et al. | 370/536 |
| 7,068,657 B2 * | 6/2006 | Keller-Tuberg | 370/394 |
| 7,145,908 B1 * | 12/2006 | Anesko et al. | 370/395.1 |
| 2004/0057388 A1 * | 3/2004 | Kolbe et al. | 370/252 |
| 2005/0254500 A1 * | 11/2005 | Hauenstein et al. | 370/395.1 |
| 2005/0286568 A1 * | 12/2005 | Hsueh et al. | 370/536 |

* cited by examiner

*Primary Examiner*—Anh-Vu H Ly

(57) ABSTRACT

A method and apparatus to monitor and analyze inverse multiplexing over asynchronous transfer mode (IMA) links of an asynchronous transfer mode (ATM) network; and determine statistics regarding cells transmitted through the IMA links. An operational status of one or more individual links of one or more monitored groups of IMA links is also determined. An apparatus to determine statistics regarding one or more IMA multiplexed links of an ATM network includes one or more IMA link pre-processors to process cells from the respective one or more IMA links according to a type of the cells; a select and collapse unit to select which of the one or more IMA links to receive the processed cells from, and collapse the processed cells of the selected IMA links into one stream; and an aligner to receive the one stream of processed cells from the select and collapse unit and determine statistics regarding the processed cells of the one stream.

15 Claims, 5 Drawing Sheets

US 7,460,541 B2

METHOD AND APPARATUS TO MONITOR AND ANALYZE NETWORK INFORMATION OF AN INVERSE MULTIPLEXED ASYNCHRONOUS TRANSFER MODE NETWORK

BACKGROUND OF THE INVENTION

1. Field of the Invention

The present invention relates to monitoring and analyzing network information. More particularly, the present invention relates to determining statistics regarding inverse multiplexing over asynchronous transfer mode (IMA) cells transmitted through IMA links of an asynchronous transfer mode (ATM) network.

2. Description of the Related Art

Generally, transfer of digital information over long distances is accomplished via packet/cell switching communication networks. An ATM network is one type of packet/cell switching communication network that is commonly used. An ATM network allows digital information including voice, video, and data to be transferred via common carrier communication links.

IMA allows high-speed streams of ATM cells to be broken up and typically be transmitted across multiple T1 or E1 communication links. The cells are then reconstructed into the original ATM cell order upon arrival at a destination. This operation is achieved by the use of the insertion of IMA Operation and Maintenance (OAM) cells and Filler cells. A typical IMA network includes several ATM network connections (logical connections) inverse multiplexed into numerous IMA links that are grouped together into IMA groups where each IMA group corresponds to one logical connection. IMA networks are well known.

Accordingly, it is important to provide a user with a network diagnostic tool that allows the user to determine what is happening on the ATM network by deciphering the network information and displaying the network information. This becomes especially important when the user needs to analyze the status of the ATM network to diagnose network related problems. Unfortunately, with typical network monitoring and diagnostic tools, the user is provided with network information that does not allow the user to easily discern network traffic information and easily pinpoint network related problems. Further, typical network monitoring and diagnostic tools simply display error messages when an error occurs and do not assist the user in determining characteristics of the error.

An apparatus is needed to test and monitor IMA links and IMA groups and the communication links (T1s and E1s) over which the cells are transmitted, and further to provide analytical statistics regarding the IMA cells transmitted.

SUMMARY OF THE INVENTION

The present invention provides a method including (a) monitoring inverse multiplexing over asynchronous transfer mode (IMA) links of an asynchronous transfer mode (ATM) network; and (b) determining statistics regarding cells transmitted through the IMA links.

The method may further include generating one or more dummy cells in response to one of the monitored IMA links being inoperative.

The method may further include determining whether each of the cells is one of a filler cell, an ICP cell, a changing ICP cell, or a payload cell, and adding identification data to the determined filler cell, ICP cell, changing ICP cell, or payload cell.

The method may further include determining an IMA frame length value of the IMA links in response to detecting an ICP cell.

The method may further include determining whether each of the cells is one of a cell, an IMA control protocol (ICP) cell, a changing ICP cell, or a payload cell, and adding identification data to the determined filler cell, ICP cell, changing ICP cell, or payload cell.

The method may further include determining the IMA links to be in an in-frame state in response to ICP cells being located at predetermined positions in a stream of the cells, and determining the IMA links to be in an out-of-frame state in response to the ICP cells not being located at the predetermined positions.

The method may further include generating sequence numbers for the cells in response to the IMA links being determined to be in the in-frame state.

The sequence numbers may be generated for the cells of the IMA links determined to be in the in-frame state that are payload cells.

The method may further include aligning the cells to be output in a correct order according to the sequence numbers.

The determined statistics may include one or more of a total number, an average number, a peak number in a predetermined time period, and a total number in a predetermined time period of the filler cells, ICP cells, changing ICP cells, and/or payload cells.

The method may further include identifying stuff cells and removing the stuff cells before determining the statistics.

The statistics may be determined regardless of a sequence of the cells.

The present invention also provides a method including (a) monitoring one or more groups of IMA links of an ATM network; and (b) determining an operational status of one or more individual links of the one or more monitored groups.

The method may further comprise using a framing algorithm to check for a presence and correct spacing of ICP cells in streams of cells transmitted through the one or more individual links of the monitored IMA groups.

The present invention also provides an apparatus to determine statistics regarding one or more IMA links of an ATM network, the apparatus including (a) one or more IMA link pre-processors to process cells from the respective one or more IMA links according to a type of the cells; (b) a select and collapse unit to select which of the one or more IMA links to receive the processed cells from, and collapse the processed cells of the selected IMA links into one stream; and (c) an aligner to receive the one stream of processed cells from the select and collapse unit and determine statistics regarding the processed cells of the one stream.

Each of the one or more IMA link pre-processors may include a cell parser to determine whether each of the cells is a filler cell, an ICP cell, a changing ICP cell, or a payload cell, and add identification data to the determined filler cell, ICP cell, changing ICP cell, or payload cell; an ICP cell reader to receive the cells from the cell parser and determine an IMA frame length value of the respective IMA links; a frame generator to receive the cells and the determined IMA frame length value from the ICP cell reader and determine a frame state of the respective IMA links according to the determined IMA frame length value; a sequence number generator to receive an ICP cell sequence number and position indication of the ICP cells from the frame generator and assign sequence numbers to the payload cells; and a buffer to store the cells having the assigned sequence numbers before being transmitted to the select and collapse unit.

The select and collapse unit may write the processed cells to a delay buffer according to sequence numbers assigned by the one or more IMA link pre-processors.

The select and collapse unit may write the processed cells to a delay buffer regardless of sequence numbers assigned by the one or more IMA link pre-processors.

The aligner may output the determined statistics and data of the processed cells.

The aligner may output the data of the processed cells in order according to sequence numbers added to the processed IMA cells.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
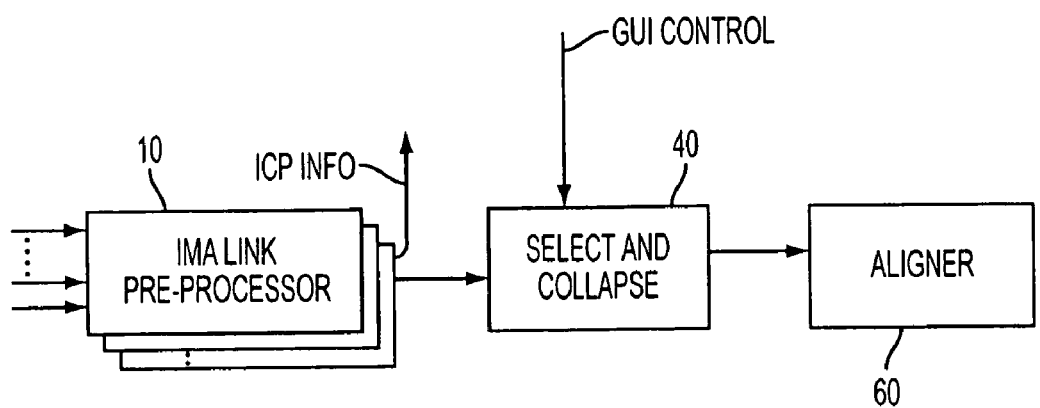
FIG. 1 illustrates an IMA network testing/monitoring apparatus according to an embodiment of the present invention.

Reference will now be made in detail to the present embodiments of the present invention, examples of which are illustrated in the accompanying drawings, wherein like reference numerals refer to the like elements throughout. The embodiments are described below to explain the present invention by referring to the figures.

An aspect of the present invention is a method including monitoring IMA links of an ATM network, and determining statistics regarding cells transmitted through the IMA links.

FIG. 1 illustrates an IMA network testing/monitoring apparatus according to an embodiment of the present invention. For example, the testing/monitoring apparatus is able to, among other things, test to determine whether an IMA link is operating correctly and/or efficiently, or whether a link is indeed an IMA link at all. Another aspect of the testing/monitoring apparatus is to determine statistics on a per-port basis regarding a differential delay between links operating in an IMA mode.

The apparatus of FIG. 1 is able to determine statistics regarding cells transmitted through one or more IMA links of an ATM network. The apparatus includes one or more IMA link pre-processors 10 to process the cells from the respective one or more IMA links according to the type of the cells, a select and collapse unit 40 to select which of the IMA links to receive the processed cells from, and collapse the processed cells of the selected IMA links into one stream, and an aligner 60 to receive the one stream of processed cells from the select and collapse unit 40 and determine statistics regarding the processed cells of the one stream.

One duty of the IMA link pre-processors 10 is, for example, to take each cell transmitted over a respective IMA link and determine a sequence number for that cell. This may be accomplished through identifying ICP cells, which are used for aligning the cells after having been broken up in order to transmit the cells over the multiple IMA links. An ICP cell generally is located at predetermined intervals in a stream of cells, typically every $32^{nd}$, $64^{th}$, $128^{th}$, or $256^{th}$ cell in the stream, and the ICP cell contains information regarding a group number for the group of links being monitored, a link number for the link on which the ICP cell is transmitted, and a sequence number. The sequence number for each cell can be determined from the link from which the cell is taken (identified by a link number), an ICP frame sequence number, and a cell number (i.e., the number of cells since the last ICP cell or offset corrected ICP cell).

Another duty of the IMA link pre-processor 10 is, for example, to provide information regarding the ICP cells to a graphical user interface (GUI) of the testing and monitoring apparatus.

The select and collapse unit 40 receives input, from the GUI control of the testing/monitoring apparatus, as to which links comprise the group of links to be monitored. The select and collapse unit 40 then selects the input cell streams accordingly and collapses the multiple streams into one stream. The stream of cells is then provided to the aligner 60, with each cell having a sequence number.

The aligner 60 takes the stream of out-of-sequence cells and re-aligns them according to their respective sequence numbers so that the cells are in sequence. A debug mode is also possible with the aligner 60, in which the cells are output in the order received, rather than being re-aligned to be in the proper order.

Figure 2:
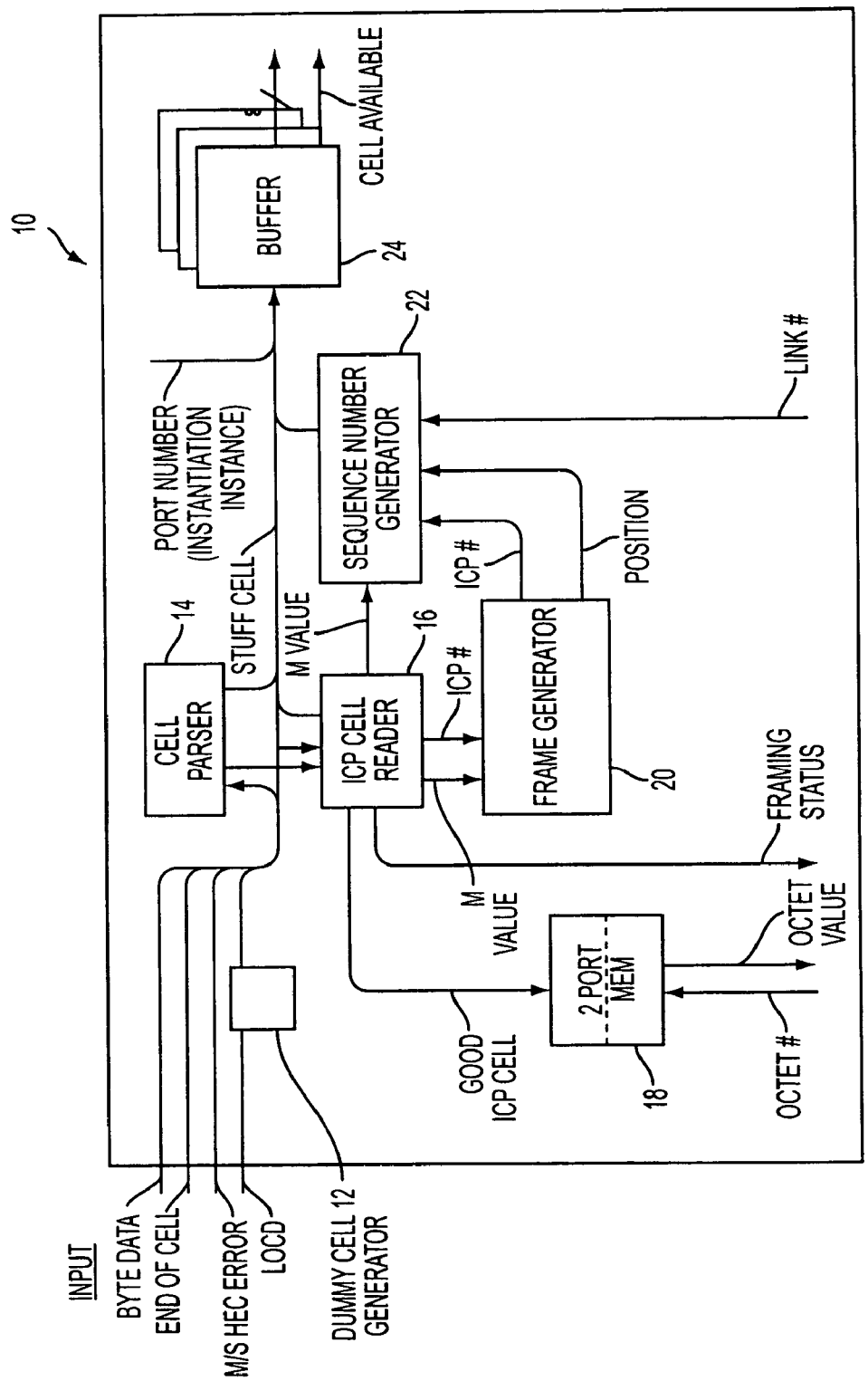
FIG. 2 illustrates the IMA link pre-processor of FIG. 1 according to an embodiment of the present invention.

FIG. 2 illustrates one of the IMA link pre-processors 10 of FIG. 1 according to an embodiment of the present invention. The IMA link pre-processor 10 receives the cells from the respective IMA link and detects and determines various information attendant to the cells. The IMA cell pre-processor 10 determines information such as, for example, byte data, an end of cell indicator, multiple and single bit Header Error Control (HEC) errors, and a loss of cell delineation (LOCD) signal.

The IMA link pre-processor 10 receives the LOCD signal in response to the link being inoperative, and a dummy cell generator 12 responds by generating a dummy cell to take the place of any cell that would have been provided if the inoperative link were operating correctly. The dummy cells are devoid of any content, and simply serve to take the place of the cells that are missing due to the inoperative link.

The cells are provided to a cell parser 14 which determines the type of each of the cells, such as, for example, filler cells, ICP cells, changing ICP cells, or payload cells. Filler cells are IMA OAM cells which do not carry any "payload," that is, filler cells do not carry information other than header data such as a virtual path indicator and a virtual channel indicator. A changing ICP cell carries information regarding the operational status of other links, such as when links are taken up and/or down. The types of the cells determined by the cell parser 14 are provided to an ICP cell reader 16.

The ICP cell reader 16 receives the cells, as well as the cell type information from the cell parser 14, and attempts to perform a framing function for the ICP cells. The ICP cell reader 16 determines an IMA frame length value (M) for the ICP cells received. The IMA frame length value indicates the frequency of the ICP cells. The IMA frame length value (M) is provided to a frame generator 20 and a sequence number generator 22, each of which will be described later. The ICP cell reader 16 also provides information regarding a "good" ICP cell to a two-port memory 18. The good ICP cell indicates the operational status of a link, as well as that the ICP framing is correctly spaced, the ICP cells are valid, there are no circuit redundancy check (CRC-10) errors in the ICP cell, etc. The two-port memory 18 is able to receive an octet number set by software, and then provide the byte of the ICP cell associated with that octet number to determine the link and group number and how many links are active, as well as the other information indicated by the good ICP cell.

The ICP cell reader 16 may also provide ICP cell information directly to a user, or software to be used by the user. An example of this would be providing only information regarding the changing ICP cells to the user or software. Another example would be an in-frame or out-of-frame indication provided by the frame generator 20, which will be described later.

The ICP cell reader 16 may also recognize a stuff cell among the ICP cells. Stuff cells are found in back to back ICP cells that may be added to the cell stream at the point of the original transmission in order to maintain the same cell rate across all of the links in the group when the links are not transmitting at the same frequency. The addition of the stuff cell(s) allows the cell rate to be the same across all of the links. Only the first of the back to back ICP cells are valid, and the rest are stuff cells. The ICP cell reader 16 identifies the stuff cell as a cell to be removed before the cells are aligned.

The frame generator 20 receives the ICP cells and the IMA frame length value from the ICP cell reader 16. The frame generator 20 looks for ICP cells according to the IMA frame length value, and frames the cells according to the IMA frame length value. If the ICP cells are located where they are expected to be according to the IMA frame length value, the IMA link enters an in-frame state. If an ICP cell is not located at the expected place in the stream, the IMA cell stream enters an out-of-frame state, and the frame generator 20 looks for the next ICP cell. The stream may not necessarily go to an out-of-frame state if only one or two ICP cells are not in their expected locations. For example, four consecutive misses of ICP cells may result in the frame generator 20 to determine the stream to be in an out-of-frame state.

The frame generator 20 supplies the ICP information and other cell position information, such as whether the IMA link is in-frame or out-of-frame, to the sequence number generator 22. The sequence number generator 22 also receives the IMA frame length (M) value from the ICP cell reader 16. The sequence number generator 22 then generates a unique and incremented sequence number for each of the payload cells, filler cells, and ICP cells. The sequence number generator 22 may also generate a sequence number for missing ICP cells, provided the IMA link remains in an in-frame state. A link number may also be provided to the sequence generator number from the user or software.

Information is also attached to the cells that includes a physical port number which indicates the actual physical port from which the cells originated. This port number, or instance number, is provided by the user or software. Information that may be appended to each cell in the IMA link pre-processor 10 comprises, for example, ICP cell identification, filler cell identification, changing ICP cell identification, a sequence number, multiple or single bit HEC error information, the physical port number, and stuff cell information.

A global start may be provided to turn the testing/monitoring apparatus on and off, so that the testing/monitoring apparatus does not run continuously whenever connected to the IMA network. A global start may also ensure that constituent parts of the IMA receiver start at the same instant of time.

After all of the described information is extracted from and added to the cells, the cells are provided to memory buffers 24. The cells are stored in the memory buffers 24 in a sequential loop. In other words, one cell is provided sequentially to each of the buffers 24, and then the loop is started over. The cells in the buffers 24 are available to the select and collapse unit 40.

Figure 3:
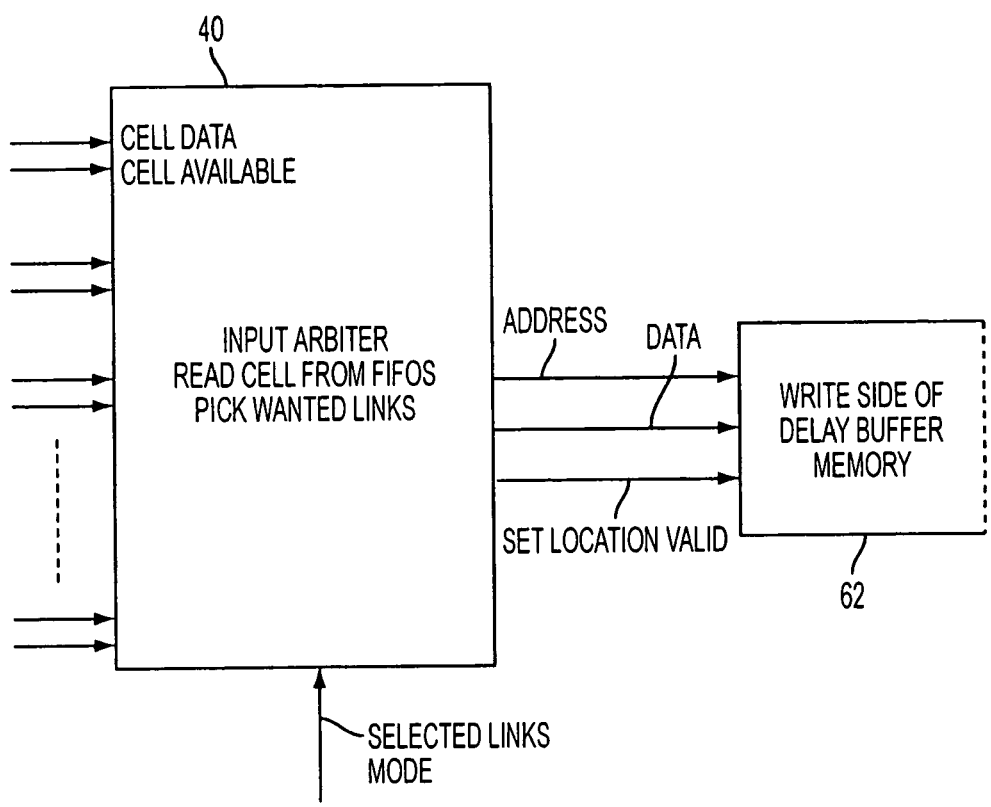
FIG. 3 illustrates the select and collapse unit of FIG. 1 according to an embodiment of the present invention.

FIG. 3 illustrates the select and collapse unit 40 of FIG. 1 according to an embodiment of the present invention. The select and collapse unit 40 receives cells, with the information appended to each of the cells by the IMA link pre-processors 10, and writes the cells into a write side of a delay buffer memory 62. The select and collapse unit 40 receives information from the memory buffers of the IMA link pre-processors 10 indicating which of the cells are available. The select and collapse unit 40 may also receive information from the GUI control regarding which of the links to actually select cells from for analysis. The select and collapse unit 40 provides cell data and addresses (sequence and link numbers) to the write side of the delay buffer memory 62.

Figure 5:
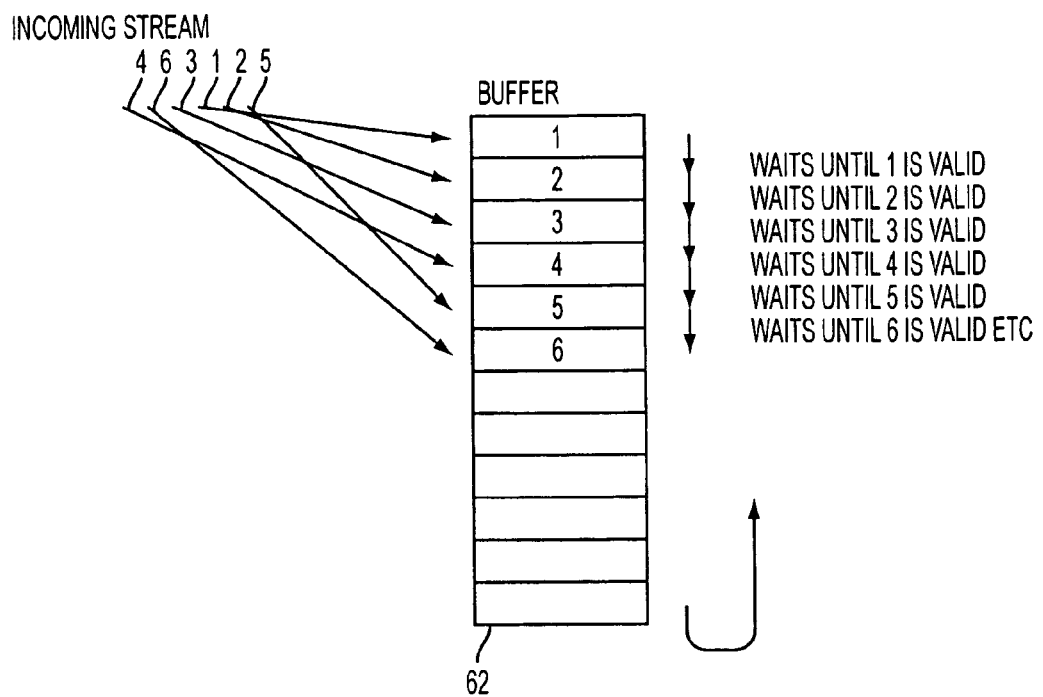
FIG. 5 illustrates the delay buffer memory of the aligner according to an embodiment of the present invention.

The select and collapse unit 40 may operate in an IMA mode or in a debug mode. In the IMA mode the select and collapse unit 40 writes the cells to the delay buffer memory 62 based on the sequence number of each cell. Upper bits of sequence numbers may be truncated in a case in which the sequence numbers are bigger than the allowed space in the delay buffer memory 62. A set location valid signal is provided to the delay buffer to indicate that a cell is ready to be read out by the aligner 60. FIG. 5 illustrates the delay buffer memory 62 of the aligner 60 according to an embodiment of the present invention, and an example of the purpose of the set location valid signal is shown. A cell with the sequence number 4 can only be output if, firstly, its location has been set as valid, and, secondly, if cells of all previous sequence numbers, including 1, 2 and 3, have been output.

In the debug mode the select and collapse unit 40 writes the cells to the delay buffer on a first come first served basis, without regard to the sequence numbers of the IMA cells. In the debug mode, the set location valid signal is set for each position as soon as it is occupied by an IMA cell, thus allowing for immediate output.

The select and collapse unit 40 does not write cells that have been identified as stuff cells by the IMA link pre-processors 10 to the delay buffer memory 62. However, status bits are provided to the parent ICP cell to indicate how long the ICP "burst" was.

Figure 4:
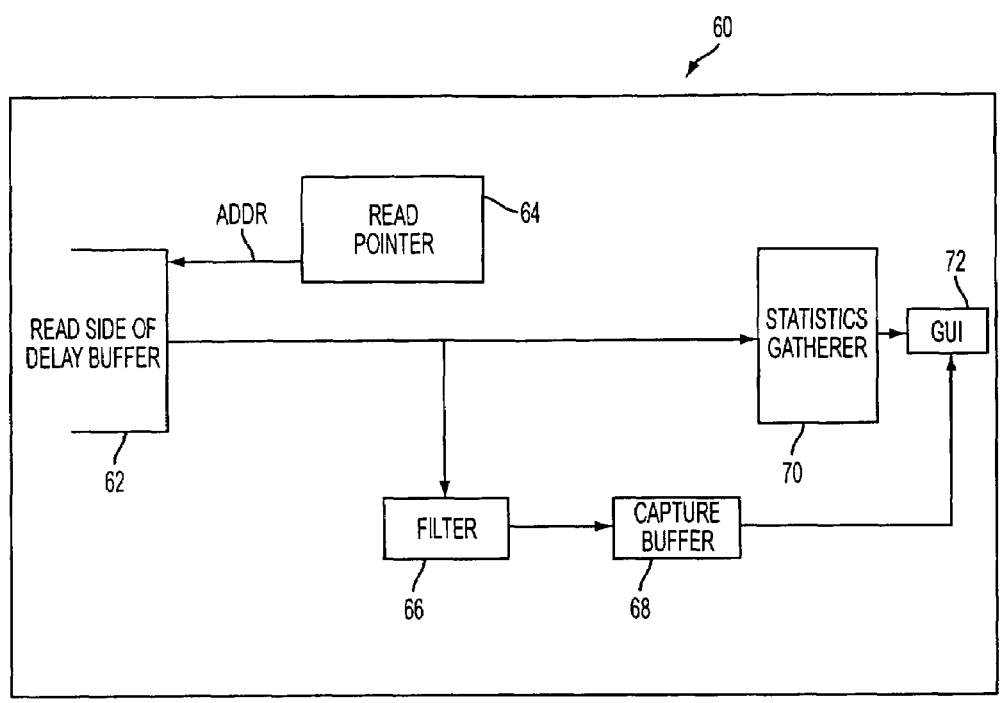
FIG. 4 illustrates the aligner of FIG. 1 according to an embodiment of the present invention.

FIG. 4 illustrates the aligner 60 of FIG. 1 according to an embodiment of the present invention. The aligner 60 comprises a read pointer 64 which points to the address of the cells to be read from the delay buffer memory 62. The read pointer 64 does not move to the next sequential address in the delay buffer memory 62 until the set location valid signal is received for that address. Therefore, when the select and collapse unit 40 is operating in the IMA mode, the aligner 60 reads the cells out in the correct order according to the sequence numbers of the cells.

After being retrieved from the delay buffer memory 62, the cells are provided to a filter 66 and a statistics gatherer 70. The filter 66 may be a configurable filter that can filter out, allow through, or a combination of both, ICP cells, filler cells, and changing ICP cells. The ICP cells that are passed along by the filter 66 are stored in a capture buffer 68, where they await retrieval to be displayed in the GUI 72.

The statistics gatherer 70 gathers statistics regarding the received cells. For example, the statistics gather may count ICP cells, filler cells, changing ICP cells, payload cells, multiple and single hec errors, and LOCD events. The statistics gatherer 70 may determine a total count of these values, calculate an average of them, peak numbers of the values during a predetermined time period, a total accumulation in a predetermined time period, etc.

The GUI 72 receives the data from the capture buffer 68 and/or the statistics from the statistics gatherer 70, and displays the requested information to the user. The GUI 72 may be displayed on any number of display devices. Examples of these display devices may be PC based monitors, handheld monitors, etc.

Accordingly, an apparatus and method of the present invention allows communication links of an ATM network to be monitored, and statistics of IMA link to be determined. This enables a user to conveniently determine the operational status of individual IMA links of the ATM network, as well as to conveniently gather statistics regarding the cells being transmitted over the IMA links.

Various protocols are described herein. However, the present invention is not limited to any particular protocols.

Various configurations and operations are described herein for an IMA link pre-processor, a select and collapse unit, and an aligner. However, the present invention is not limited to these specific configurations and operations, and other configurations and operations are possible.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A method, comprising:
    monitoring inverse multiplexing over asynchronous transfer mode (IMA) links of an asynchronous transfer mode (ATM) network;
    determining whether each of the cells is one of a filler cell, an IMA control protocol (ICP) cell, a changing ICP cell, or a payload cell, and adding identification data to the determined filler cell, ICP cell, changing ICP cell, or payload cell; and
    determining statistics regarding cells transmitted through the IMA links.

2. The method according to claim 1, further comprising generating one or more dummy cells in response to one of the monitored IMA links being inoperative.

3. The method according to claim 1, further comprising determining an IMA frame length value of the IMA links in response to detecting an ICP cell.

4. The method according to claim 3, further comprising framing the IMA links corresponding to the determined IMA frame length value.

5. The method according to claim 1, wherein the determined statistics comprise one or more of a total number, an average number, a peak number in a predetermined time period, and a total number in a predetermined time period of the filler cells, ICP cells, changing ICP cells, and/or payload cells.

6. The method according to claim 1, further comprising identifying stuff cells and removing the stuff cells before determining the statistics.

7. The method according to claim 1, wherein the statistics are determined regardless of a sequence of the cells.

8. A method comprising:
    monitoring inverse multiplexing over asynchronous transfer mode (IMA) links of an asynchronous transfer mode (ATM) network;
    determining an IMA frame length value of the IMA links in response to detecting an IMA control protocol (ICP) cell;
    framing the IMA links corresponding to the determined IMA frame length value; determining the IMA links to be in an in-frame state in response to ICP cells being located at predetermined positions in a stream of the cells, and determining the IMA links to be in an out-of-frame state in response to the ICP cells not being located at the predetermined positions;
    determining statistics regarding cells transmitting through the IMA links;
    generating sequence numbers for the cells in response to the IMA links being determined to be in the in-frame state; and aligning the cells to be output in a correct order according to the sequence numbers.

9. The method according to claim 8, wherein the sequence numbers are generated for the cells of the IMA links determined to be in the in-frame state that are payload cells.

10. An apparatus to determine statistics regarding one or more inverse multiplexing over asynchronous transfer mode (IMA) links of an asynchronous transfer mode (ATM) network, the apparatus comprising:
    one or more IMA link pre-processors to process cells from the respective one or more IMA links according to a type of the cells, wherein each of the one or more IMA link pre-processors comprises a cell parser to determine whether each of the cells is a filler cell, an IMA control protocol (ICP) cell, a changing ICP cell, or a payload cell, and add identification data to the determined filler cell, ICP cell, changing ICP cell, or payload cell;
    a select and collapse unit to select which of the one or more IMA links to receive the processed cells from, and collapse the processed cells of the selected IMA links into one stream; and
    an aligner to receive the one stream of processed cells from the select and collapse unit and determine statistics regarding the processed cells of the one stream.

11. The apparatus of claim 10, wherein each of the one or more IMA link pre-processors comprises:
    an ICP cell reader to receive the cells from the cell parser and determine an IMA frame length value of a respective IMA link;
    a frame generator to receive the cells and the determined IMA frame length value from the ICP cell reader and determine a frame state of the respective IMA link according to the determined IMA frame length value;
    a sequence number generator to receive an ICP cell sequence number and position indication of the ICP cells from the frame generator and assign sequence numbers to the payload cells; and
    a buffer to store the cells having the assigned sequence numbers before being transmitted to the select and collapse unit.

12. The apparatus of claim 10, wherein the select and collapse unit writes the processed cells to a delay buffer according to sequence numbers assigned by the one or more IMA link pre-processors.

13. The apparatus of claim 10, wherein the select and collapse unit writes the processed cells to a delay buffer regardless of sequence numbers assigned by the one or more IMA link pre-processors.

14. The apparatus of claim 10, wherein the aligner outputs the determined statistics and data of the processed cells.

15. The apparatus of claim 14, wherein the aligner outputs the data of the processed cells in order according to sequence numbers added to the processed IMA cells.

* * * * *

UNITED STATES PATENT AND TRADEMARK OFFICE
CERTIFICATE OF CORRECTION

PATENT NO. : 7,460,541 B2
APPLICATION NO. : 10/948681
DATED : December 2, 2008
INVENTOR(S) : Ward et al.

It is certified that error appears in the above-identified patent and that said Letters Patent is hereby corrected as shown below:

On the Title page, in field (75), in "Inventors", in column 1, line 3, delete "Ruhmow" and insert -- Ruhnow --, therefor.

In columns 7-8, lines 61-67 (Column 7) and 1-13 (Column 8), delete "8. A method comprising:
  monitoring inverse multiplexing over asynchronous transfer mode (IMA) links of an asynchronous transfer mode (ATM) network;
  determining an IMA frame length value of the IMA links in response to detecting an IMA control protocol (ICP) cell;
  framing the IMA links corresponding to the determined IMA frame length value; determining the IMA links to be in an
in-frame state in response to ICP cells being located at predetermined positions in a stream of the cells, and determining the IMA links to be in an out-of-frame state in response to the ICP cells not being located at the predetermined positions;
  determining statistics regarding cells transmitting through the IMA links; generating sequence numbers for the cells in response to the IMA links being determined to be in the in-frame state;
and aligning the cells to be output in a correct order according to the sequence numbers." and insert -- 8. A method comprising:
  monitoring inverse multiplexing over asynchronous transfer mode (IMA) links of an asynchronous transfer mode (ATM) network;
  determining an IMA frame length value of the IMA links in response to detecting an IMA control protocol (ICP) cell;
  framing the IMA links corresponding to the determined IMA frame length value; determining the IMA links to be in an
in-frame state in response to ICP cells being located at predetermined positions in a stream of the cells, and determining the IMA links to be in an out-of-frame state in

UNITED STATES PATENT AND TRADEMARK OFFICE
CERTIFICATE OF CORRECTION

PATENT NO. : 7,460,541 B2
APPLICATION NO. : 10/948681
DATED : December 2, 2008
INVENTOR(S) : Ward et al.

It is certified that error appears in the above-identified patent and that said Letters Patent is hereby corrected as shown below:

response to the ICP cells not being located at the predetermined positions;
  determining statistics regarding cells transmitting through the IMA links;
generating sequence numbers for the cells in response to the IMA links being determined to be in the in-frame state;
and
aligning the cells to be output in a correct order according to the sequence numbers. --, therefor. (Indentation Error)

Signed and Sealed this

Twenty-sixth Day of May, 2009

JOHN DOLL
*Acting Director of the United States Patent and Trademark Office*